(12) United States Patent
Wild et al.

(10) Patent No.: US 6,364,090 B1
(45) Date of Patent: Apr. 2, 2002

(54) APPARATUS FOR HANDLING BAGS

(75) Inventors: Hans-Peter Wild, Zug (CH); Eberhard Kraft, Neckarbischofsheim (DE)

(73) Assignee: INDAG Geselischaft fur Industriebedarf mbH & Co., Heidelberg (DE)

( * ) Notice: Subject to any disclaimer, the term of this patent is extended or adjusted under 35 U.S.C. 154(b) by 0 days.

(21) Appl. No.: 09/690,410

(22) Filed: Oct. 17, 2000

(30) Foreign Application Priority Data

Oct. 28, 1999 (DE) .......................................... 199 52 007

(51) Int. Cl.⁷ .............................................. B65G 47/24
(52) U.S. Cl. ........................................ 198/408; 198/433
(58) Field of Search .................................. 198/408, 433

(56) References Cited

U.S. PATENT DOCUMENTS

| | | |
|---|---|---|
| 3,191,748 A | 6/1965 | Martin |
| 4,108,300 A | 8/1978 | Hayase et al. |
| 4,223,779 A * | 9/1980 | Hopkins ..................... 198/408 |
| 4,768,642 A | 9/1988 | Hunter |
| 4,800,703 A | 1/1989 | Goodman |
| 5,467,862 A | 11/1995 | Helmstetter |
| 5,768,856 A | 6/1998 | Odenthal |
| 5,794,756 A * | 8/1998 | Taylor et al. ............... 198/433 |

FOREIGN PATENT DOCUMENTS

| | | |
|---|---|---|
| DE | 406807 | 12/1924 |
| EP | 0700832 A2 | 8/1995 |

* cited by examiner

*Primary Examiner*—Joseph E. Valenza
(74) *Attorney, Agent, or Firm*—Marshall, Gerstein & Borun

(57) ABSTRACT

Apparatus for handling bags that are conveyed on a first conveyor in an upright position and on a second conveyor in a lying position, particularly for the gentle handling of bags and adapted to the handling of stand up bags, by providing a transfer device between the first and second conveyor, the first conveyor comprising a transfer portion in which the bags are oriented in a substantially horizontal direction in space, and the transfer device comprising a depositing surface for forming a row of lying bags, alone with a gripper for pulling the bags from the first conveyor onto the depositing surface in a substantially straight movement, and a delivery means for delivering the row of bags to the second conveyor.

12 Claims, 2 Drawing Sheets

APPARATUS FOR HANDLING BAGS

FIELD OF THE INVENTION

The present invention relates to an apparatus for handling and particularly for handling flexible beverage bags.

BACKGROUND OF THE INVENTION

Such an apparatus is e.g. known from U.S. patent specification No. 4,108,300. The known apparatus serves to handle cushion-shaped, non-standing bags that consist of two flat film pieces laid one upon the other and welded to each other all around their edges. The bags are first welded at three sides and are then passed in said state in suspended fashion through a filling and closing station in which the bags are filled and the fourth side is then sealed. The clamps used for the suspended transportation are then released and the bags just fall by gravitational force onto the second conveyor where they are further transported in a lying position. However, such a transfer from a suspended or upright transportation position into a horizontal or lying transportation position can at best be carried out with this type of bag because due to their cushion-like shape these bags will automatically assume the correct lying position on the conveyor.

Stand up bags consist of film pieces that are directly welded to one another at three sides only, i.e. the two side edges and the edges of the closing opening, while a self-standing bottom is inserted or formed between the two residual edges. Up to now these stand up bags have only been transported in an upright or standing position. Furthermore, for a transfer from the standing into a lying position, it is not possible to simply drop the bags, as due to their self-standing bottom these would either be deflected into the most different directions or would just be further conveyed in a standing position.

SUMMARY OF THE INVENTION

It is therefore the object of the present invention to provide an apparatus which permits a gentle and controlled transfer of bags from the upright into a lying position:

The present invention creates an apparatus with which, in particular, stand up bags can be reliably and correctly moved into an exactly defined lying transportation position. However, other bag shapes can also be handled with the apparatus of the invention, in particular in cases where a gentle treatment is required (e.g. because of sensitive contents) where the bag must not be dropped.

BRIEF DESCRIPTION OF THE DRAWINGS

An embodiment of the invention shall now be explained in more detail with reference to the drawings, in which.

DETAILED DESCRIPTION OF THE PREFERRED EMBODIMENTS

Figure 1:
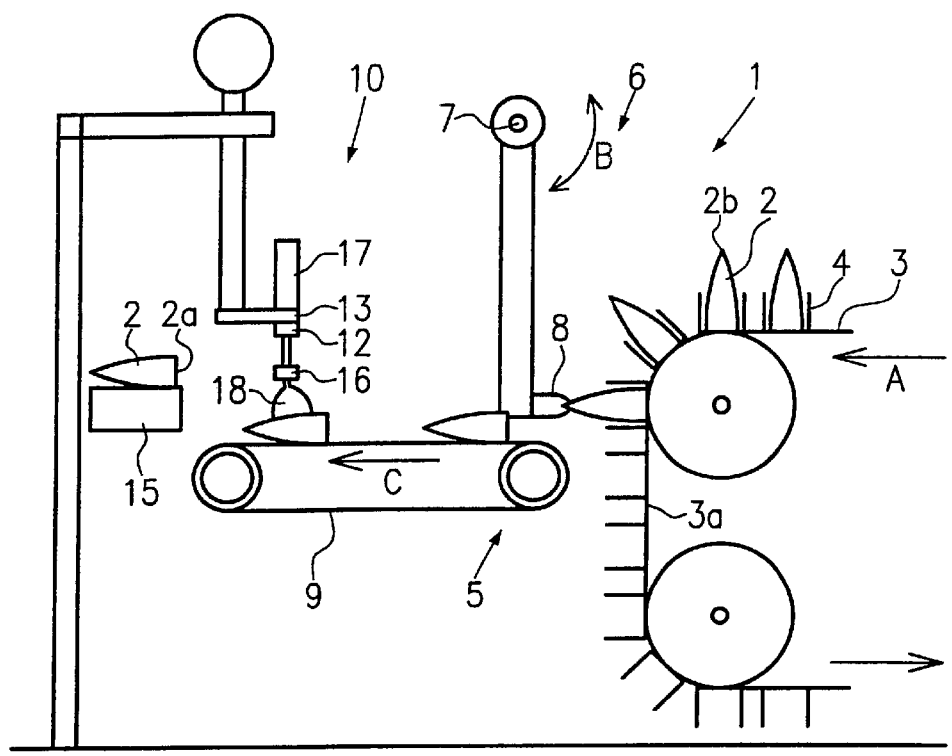
FIG. 1 is a schematic side view showing the apparatus according to the invention.

FIG. 1 is a schematic view showing an apparatus 1 for handling bags 2, said bags 2 being illustrated as stand up bags which consist of two film pieces welded to each other at two opposite sides, a self-standing bottom 2a inserted at or integrally formed with one of the remaining sides, and a sealing edge 2b closing the last side, i.e. the filler opening. The bags 2 are supplied by a first conveyor 3. The first conveyor 3 is preferably the conveyor that, after the bags 2 have been filled with hot beverages and closed by the sealing edge 2b, is transporting the bags 2 through a cooling device (not shown), such as a water bath. The conveyor 3 is provided with accommodation mountings 4 (of which only a few are shown) for holding the bags 2 in an upright, bottom-supported conveying position. At the point of deflection of the conveyor belt 3, there is provided a vertical portion 3a which is passed through by the conveyor belt 3 in the direction of arrow A from the top to the bottom, so that the bags 2 in the vertical portion 3a assume a substantially horizontal position in space, said position approximately corresponding to the orientation in which the bags 2 are transported in a lying position.

The vertical transfer portion 3a has assigned thereto a transfer device 5 which contains a gripper 6 with a clamp 8 that is pivotable about a horizontal axis 7 in the direction of the double-headed arrow B. The clamp 8 is designed and arranged such that it is able to grip the bag 2 on its sealing edge 2b and to pull it in the horizontal direction in a substantially straight movement (large distance between clamp 8a and axis 7) from its respective accommodating means 4 and to deposit the same on a transfer conveyor 9.

In the illustrated embodiment, the first conveyor 3 is able to convey a plurality of bags 2 side by side in a direction transverse to the conveying direction A. Hence, the gripper 6 includes a corresponding number of clamps 8 so that the plurality of bags 2 are deposited on the transfer conveyor 9 in a direction perpendicular to the plane of FIG. 1. The transfer conveyor 9 subsequently conveys the bags in the direction of arrow C out of the portion of the gripper 6 and into the portion of a delivery means 10.

In cases where the first conveyor 3 is only suited for conveying bags arranged individually one after the other in the conveying direction, the transfer conveyor should expediently move in a direction perpendicular to the plane of drawing of FIG. 1, whereby a row of bags is formed.

Figure 2:
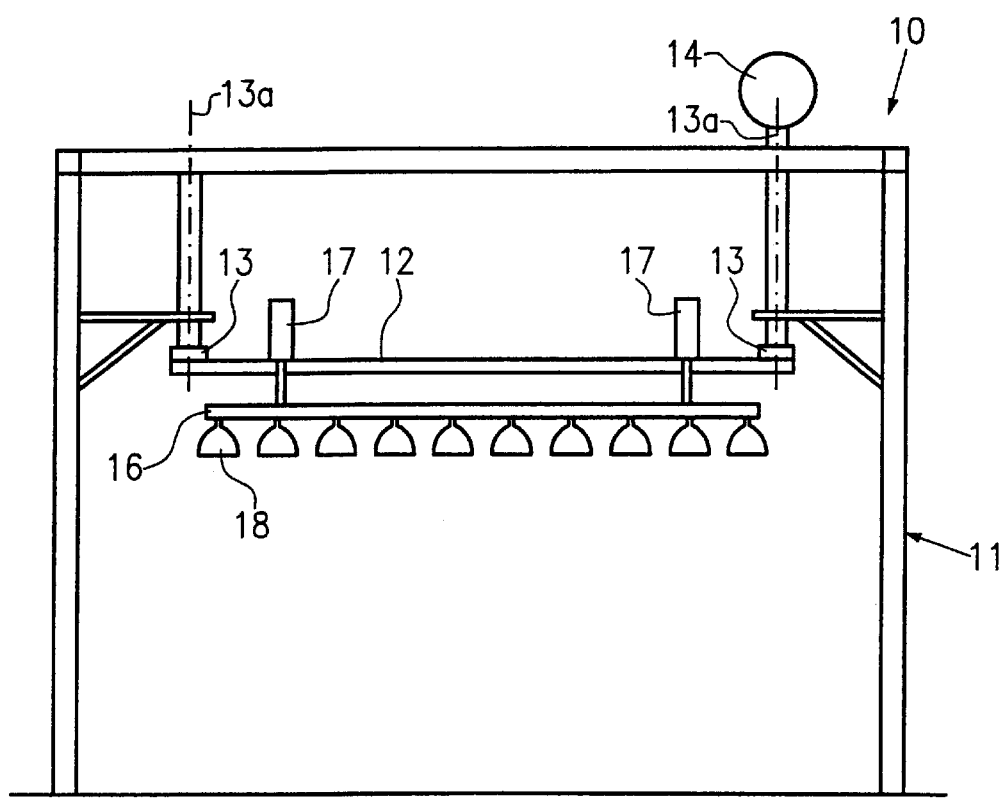
FIG. 2 is a schematic side view of the transfer device of the apparatus according to FIG. 1.
Figure 3:
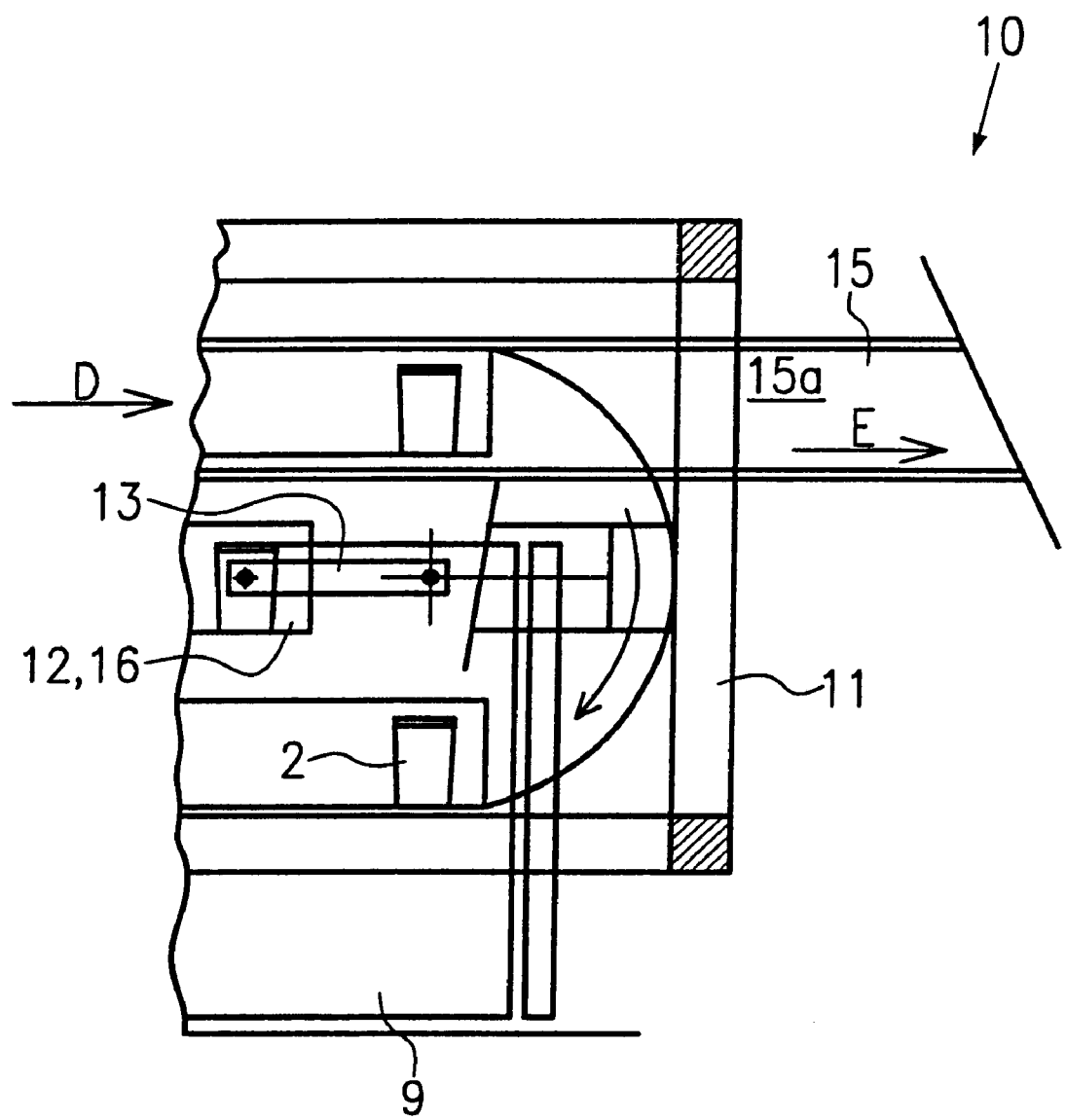
FIG. 3 is a schematic top view on the transfer device according to FIG. 1.

The delivery means 10 is shown in more detail in FIGS. 2 and 3. The delivery means 10 contains an elongated horizontal carrier 12 which is suspended from a frame 11 and is moved in the direction of arrow D via two cranks 13 of equal length around two spaced-apart vertical axes 13a by a motor 14 in the way shown in FIG. 3. While performing the movement in the direction of arrow D, the carrier 12 is displaced substantially in parallel between the transfer conveyor 9 and a second conveyor for transporting the bags 2 in a lying position and is slightly displaced in the conveying direction E of the second conveyor. The second conveyor 15 is a standard, endless conveyor belt having a horizontal conveying surface 15a for transportation in a lying position.

A mounting carrier 16 is secured to the carrier 12 via cylinder-piston units 17 to be adjustable in height, but is otherwise fastened such that the mounting carrier 16 exactly follows the carrier 12 in its movement along arrow E. The mounting carrier 16 has secured thereto a plurality of holding means 18 which are designed in the illustrated embodiment as suction means, the vacuum supply of which is not shown in more detail. One suction means 18 is respectively provided for each bag of a row.

The apparatus according to the invention operates in the following way:

In FIG. 1, bags 2 reach the first conveyor 3 side by side and in a row one after the other in the conveying direction A and, in the transfer portion 3a, they are oriented in a substantially horizontal direction. The plurality of adjacent clamps 8 of the gripper 6 grip the bags, pull them out of their accommodating means 4 and deposit the same in a row on the transfer conveyor 9. The latter transports the row of bags from the area of the gripper 6 into the area of the delivery means 10 up to and below the suction means 18. The suction means 18 are lowered by the piston-cylinder units 17 onto the bags, vacuum is applied, the bags are lifted, if necessary, and the carrier 12 is rotatingly driven around the axes 13a so that it successively assumes the positions schematically shown in FIG. 3, in which the row, nevertheless, maintains the same orientation, i.e. in parallel with the conveying direction E of the second conveyor 15, and is arranged with its self-standing bottoms to face the first conveyor 3. When the carrier 12 is positioned above the second conveyor 15, the mounting carrier 16 with the suction means 18 is lowered while the mounting carrier 16 and the carrier 12 are moving for a short distance in parallel with the conveying direction E of the second conveyor 15. The application of vacuum is terminated, and the bags are transferred to the second conveyor 15 on which the bags are e.g. moved for further processing to a drinking-straw applying means and/or a packaging means. The carrier 12 with the mounting carrier 16 returns to the transfer conveyor 9, picks up the next row of bags at said conveyor and also transports this row to the second conveyor 15. The length of the row and the conveying speeds are matched with one another such that on the second conveyor 15 the successively transferred rows follow one another, if possible, without any space thereinbetween.

In a modification of the described and illustrated embodiment the gripper may comprise a plurality of clamps rotating in a single direction. A gripper of a different design or with a different drive is also possible. Furthermore, the holding means for the bags can also be designed as a clamp, or the like, instead of a suction cup. The delivery means equipped with the movable carrier can also be combined with other devices for conveying bags in a lying position or can be arranged at other places along the transportation path of bags.

We claim:

1. In an apparatus for handling bags, said bags being conveyed in an upright position on a first conveyor and in a lying position on a second conveyor, the improvement comprising a transfer device (5) is provided between the first and second conveyors (3, 15) for handling stand up bags (2), said first conveyor (3) comprising a transfer portion (3a) in which the bags (2) are oriented in a substantially horizontal direction in space, and said transfer device (5) comprising a depositing surface (9) for forming a row of lying bags (2), a gripper (6) for pulling the bags (2) from said first conveyor (3) onto said depositing surface (9) in a substantially straight movement, and delivery means (10) for delivering the row of bags (2) to said second conveyor (15).

2. The apparatus according to claim 1, wherein said first conveyor (3) conveyor belt with accommodating means (4) for comveying the bags (2) in an upright position, said conveyor belt being oriented in a vertical direction in said transfer portion (3a).

3. The apparatus according to claim 1 or 2, wherein said first conveyor (3) is a conveyor assigned to a cooling device.

4. The apparatus according to claim 1 or 2, claim 1, wherein said gripper (6) contains clamps (8) that are pivotable about an axis (7).

5. The apparatus according to claim 1 or 2, wherein said first conveyor (3) is designed for conveying a plurality of bags (2) that are arrange side-by-side in the conveying direction (A), said plurality of bags (2) corresponding to the number of the bags (2) in the row, and that said gripper (6) is designed for simultaneously withdrawing and depositing all bags (2) of then row.

6. The apparatus according to claim 1, wherein said delivery means (10) comprises an elongated movable carrier (12, 16) and a number of holding means (18) for the bags (2), said number of holding means (18) corresponding to the number of bags (2) of a row.

7. The apparatus according to claim 6, wherein said holding means are suction means (18).

8. The apparatus according to claim 6 wherein said carrier (12, 16) is movable by means of cranks (13) around two axes (13a, 13b) in a closed path of a constant longitudinal orientation between said depositing surface (9) and said second conveyor 15.

9. The apparatus according to claim 8, wherein the motional direction (D) of said carrier (12, 16) above said second conveyor (15) substantially corresponds to the direction (E) of said second coneyor (15).

10. The apparatus according to claim 6, 7, 8 or wherein said holding means (18) are adjustable in height.

11. The apparatus according to claim 1, wherein said depositing surface is formed by a transfer conveyor (9).

12. The apparatus according to claim 1, wherein said delivery means comprises an elongated carrier (12, 16) which is provided with holding means (18) for simultaneously receiving, holding and transferring a plurality of bags (2) and which is movable by means of cranks (13) around two axes (13a, 13b) within a closed path of a constant longitudinal orientation.

* * * * *

UNITED STATES PATENT AND TRADEMARK OFFICE
CERTIFICATE OF CORRECTION

PATENT NO. : 6,364,090 B1
DATED : April 2, 2002
INVENTOR(S) : Hans-Peter Wild et al.

It is certified that error appears in the above-identified patent and that said Letters Patent is hereby corrected as shown below:

<u>Title page,</u>
Item [73], Assignee "INDAG Geselischaft fur Industriebedarf mbH & Co., Heidelberg (DE)" should be -- INDAG Gesellschaft fur Industriebedarf mbH & Co., Heidelberg (DE) --

Signed and Sealed this

Twenty-fifth Day of June, 2002

*Attest:*

JAMES E. ROGAN
*Attesting Officer*    *Director of the United States Patent and Trademark Office*

UNITED STATES PATENT AND TRADEMARK OFFICE
CERTIFICATE OF CORRECTION

PATENT NO.    : 6,364,090 B1
DATED         : April 2, 2002
INVENTOR(S)   : Hans-Peter Wild It is certified that error appears in the above-identified patent and that said Letters Patent is hereby corrected as shown below:

<u>Title page,</u>
Item [57], ABSTRACT,
Line 9, delete "alone" and insert -- along --

<u>Column 4,</u>
Line 6, after "(3)", insert -- comprises a --
Line 12, delete "claim 1 or 2,"
Line 17, change "arrange" to -- arranged --
Line 21, delete "then" and insert -- the --

Signed and Sealed this

Eighth Day of October, 2002

*Attest:*

*Attesting Officer*

JAMES E. ROGAN
*Director of the United States Patent and Trademark Office*